United States Patent
Bauch et al.

(10) Patent No.: US 8,547,088 B2
(45) Date of Patent: Oct. 1, 2013

(54) ENCODED SCALE BODY WITH ENCODING MATERIAL ON SUPPORT BAND

(75) Inventors: Christoph Bauch, Stuttgart (DE); Thomas Burkhardt, Zell (DE); Roland Holder, Dettingen / Teck (DE); Torsten Beutler, Ostifildern (DE); Karl Blessing, Nuertingen-Raidwangen (DE); Bernhard Hahn, Wernau/N (DE)

(73) Assignee: Balluff GmbH, Neuhausen (DE)

( * ) Notice: Subject to any disclaimer, the term of this patent is extended or adjusted under 35 U.S.C. 154(b) by 375 days.

(21) Appl. No.: 12/470,796

(22) Filed: May 22, 2009

(65) Prior Publication Data

US 2010/0219811 A1    Sep. 2, 2010

(30) Foreign Application Priority Data

Feb. 27, 2009    (DE) ............... 20 2009 003 253 U

(51) Int. Cl.
*G01B 7/14* (2006.01)
*G01B 7/30* (2006.01)

(52) U.S. Cl.
USPC ............. 324/207.22; 324/207.24; 324/207.25

(58) Field of Classification Search
USPC .................. 324/207.13–207.25, 173–174
See application file for complete search history.

(56) References Cited

U.S. PATENT DOCUMENTS

| | | | | |
|---|---|---|---|---|
| 5,635,833 A | * | 6/1997 | Onodera et al. | 324/207.22 |
| 5,841,274 A | * | 11/1998 | Masreliez et al. | 324/207.17 |
| 5,909,115 A | * | 6/1999 | Kano et al. | 324/207.21 |
| 6,113,276 A | * | 9/2000 | Bourgeois-Jacquet | 384/448 |
| 6,675,491 B2 | * | 1/2004 | Sasaki et al. | 33/706 |
| 6,717,401 B2 | * | 4/2004 | Schwabe | 324/207.22 |
| 2003/0128028 A1 | * | 7/2003 | Jordil | 324/207.21 |
| 2004/0036469 A1 | * | 2/2004 | Fries | 324/207.21 |
| 2009/0033946 A1 | * | 2/2009 | Kon et al. | 356/499 |
| 2010/0207617 A1 | * | 8/2010 | Novak et al. | 324/207.25 |

FOREIGN PATENT DOCUMENTS

| | | | |
|---|---|---|---|
| JP | 06003105 A | * | 1/1994 |
| JP | 06074790 A | * | 3/1994 |

OTHER PUBLICATIONS

"Lineare Wegund Abstandssensoren," Thomas Burkhardt, Albert Feinaugle, Sorin Fericean, Alexander Forkl, Verlag moderne Industrie, Die Bibliotek der Technik vol. 271, Munich 2004, chapter "Wegsensoren mit magnetisch kodiertem MaBkorper".

* cited by examiner

*Primary Examiner* — Jay Patidar
(74) *Attorney, Agent, or Firm* — Dinsmore & Shohl LLP

(57) ABSTRACT

Encoded scale bodies for position/displacement measuring systems and position/displacement measurement systems including scale bodies are disclosed. An encoded scale body includes a support band and at least one encoding layer made of encoding material. The encoding layer is arranged on the support band. The encoded scale body further includes a cover band which covers the encoding material towards an outside space. The cover band is formed by the support band. The support band/cover band is elastically flexible. The support band, which is the mechanical holder for the encoding material, may serve to mechanically stabilize the encoded scale body. The cover band covers the encoding material and may protect the encoding layer from external effects such as, in particular, mechanical forces. The flexible support band/ cover band may permit the encoded scale body to be used as band material, and for example, a roll material.

21 Claims, 4 Drawing Sheets

ENCODED SCALE BODY WITH ENCODING MATERIAL ON SUPPORT BAND

CROSS REFERENCE TO RELATED APPLICATIONS

The present specification claims priority to German utility model application number 20 2009 003 253.1 filed Feb. 27, 2009, which is incorporated herein by reference.

TECHNICAL FIELD

This specification generally relates to an encoded scale body for a position/displacement measuring system, comprising a support band, at least one encoding layer made of encoding material, which is arranged on the support band, and a cover band which covers the encoding material towards an outside space. The invention further relates to a position/displacement measuring system.

BACKGROUND

Magnetically encoded scale bodies and position/displacement measuring systems which comprise such magnetically encoded scale bodies are described, for example, in the chapter "Wegsensoren mit magnetisch kodiertem Maßkörper" (Displacement Sensors with Magnetically Encoded Scale Body) in the publication "Lineare Weg-und Abstandssensoren" (Linear Displacement and Distance Sensors) by Thomas Burkhardt, Albert Feinäugle, Sorin Fericean and Alexander Forkl, Verlag Moderne Industrie, Munich 2004. Corresponding measuring systems comprise a sensor head, which contains magnetic field sensors and preferably the complete electronics, and a magnetically encoded scale body. The scale body comprises alternating magnetic north and south poles. The magnetic lines of field of the magnetically encoded scale body form a three-dimensional vector field. The sensor head moves above the scale body. The sensor head contains, for example, two magnetic field sensors which measure either the component of the magnetic field vector in the direction of their sensitivity or the angle of the magnetic vector field to the direction of motion. Counting magnetic periods provides information as to the distance traveled.

SUMMARY

In accordance with the invention, an encoded scale body is provided, which is simply constructed and comprises comprehensive application possibilities.

In accordance with an embodiment of the invention, in the encoded scale body the cover band is formed by the support band.

The support band is the mechanical holder for the encoding material and serves also to mechanically stabilize the overall arrangement. The cover band covers the encoding material towards the outside space and protects the at least one encoding layer from external effects such as, in particular, mechanical forces.

In the solution according to the invention, the support band and the cover band are one and the same, i.e., the support band has the protective function of the cover band. This results in a simple construction.

The support band and the at least one encoding layer lie directly on each other. Therefore, when there is any bending they do not move relative to each other. This, in turn, makes it possible to impart one or more bends to the encoded scale body (support band including encoding material) along the length direction and to variably adapt the encoded scale body to an application and to place it, in particular, at least partially thereon. This allows, for example, a correspondingly encoded scale body to be placed around a shaft or the like.

Furthermore, the correspondingly encoded scale body is simple to handle for the user. In particular, the encoded scale body can be provided as band material and, for example, as roll material. A user himself can then cut the length to the specific application.

In the solution according to the invention, the application can be used as "support" and "cover", respectively; the at least one encoding layer can be applied to the application.

In particular, the cover band covers the encoding material towards a sensor device. The sensor device comprises one or more sensors which are sensitive to the encoding. This allows the at least one encoding layer to be protected towards the outside space.

In the case of a magnetically encoded scale body, the support band/cover band is produced from a non- or at the most slightly (in comparison with the encoding material) magnetizable material. It is produced, for example, from a metallic material and, in particular, stainless steel. It is thereby dimensionally stable and elastic in order to provide a high variability and adaptability, in particular, owing to its elastic flexibility. Furthermore, a plastic deformation is also possible, for example, to produce hook elements, as described in greater detail below.

In the case of a capacitively encoded scale body, the support band/cover band is preferably made of an electrically non-conductive material. In the case of an optically encoded scale body, the support band/cover band is transparent in the relevant spectral range.

In a scale body which is mounted on a component the at least one encoding layer made of encoding material preferably lies between the component and the support band/cover band. This protects the layer of encoding material towards the outside space and towards the application by abutment on the application. Furthermore, this enables simple and secure fixing to the application. If the application itself consists of a magnetizable material, the encoding layer can also be fixed to the application by means of magnetic adherence if the encoding layer is produced from a magnetic material.

It can be provided that the at least one encoding layer contacts the component at least partially. This provides support for the encoded scale body on the application.

In particular, the encoding material is fixed directly to the support band/cover band and, for example, adhesively bonded to it. This results in a simple construction.

It is advantageous if the support band/cover band is dimensionally stable. This results in optimal adaptability to an application.

It is furthermore favorable if the support band/cover band is elastically flexible. This makes it possible, for example, to provide the encoded scale body as band material, for example, in the form of a roll. The elastic flexibility enables optimal adaptability to an application.

It is quite particularly advantageous if the support band/cover band with the encoding material arranged thereon is flexible, i.e., the encoded scale body is flexible and, in particular, elastically flexible, as a whole.

It is advantageous if the scale body consists, with respect to the sequence of layers, of the support band/cover band and the at least one encoding layer on the support band/cover band. The at least one encoding layer is, in particular, fixed with a substance-to-substance connection (for example, using a layer of adhesive) to the support band/cover band.

The encoded scale body comprises a first surface which is formed on the encoding material and an opposing second surface which is formed on the support band/cover band. This first surface and the second surface are outer surfaces.

It can be provided that the scale body has a bend. The bend can be produced by plastic deformation or elastic deformation using appropriate force.

In one embodiment, the support band/cover band has a curve or bend at at least one end. This curve or bend creates a type of hook element for hooking the scale body to a corresponding opening. This makes it possible, for example, to produce a closed device which includes the encoded scale body. Encoding material may or may not be arranged at the curve or bend.

It is advantageous if a connecting device is provided which connects a first area of the scale body and a second area of the scale body to each other, the first area lying in the vicinity of a first end of the scale body and the second area in the vicinity of a second end of the scale body. This allows the encoded scale body to be placed around an application and, in particular, this application can be enclosed. The connecting device ensures that the previously free ends are coupled to each other. This enables fixing to the application.

In one embodiment, the connecting device comprises a first fixing device for a first area of the scale body and a second fixing device for a second area of the scale body, a distance between the first fixing device and the second fixing device being fixedly adjustable. This enables the scale body to be placed around an application and allows it to have close contact with the application over an entire measuring range. The first fixing device and the second fixing device are, for example, openings through which hook elements of the scale body produced by bends or curves are looped.

In particular, the combination of scale body and connecting device forms a closed device. The closed device allows an application such as, for example, a shaft to be enclosed in order to fix the encoded scale body to this application.

In one embodiment, the scale body is magnetically encoded. The encoding material is then a magnetic material. The encoding is formed by a particular sequence of north and south pole fields.

It can also be provided that the scale body is affixed to a magnetizable component by magnetic adherence. In addition, a further mechanical fixing can be provided, for example, using a connecting device. The fact that the magnetic material can be positioned facing an application and can contact it enables such a fixing by magnetic adherence.

In principle, it is also possible for the scale body to be capacitively encoded. In such an "electrostatic" encoding, capacitive-sensitive sensors can be used to read an encoding. The support band/cover band is then produced from an electrically non-conductive material.

It is also possible to optically encode the scale body. One or more corresponding optical sensors can then read the encoding.

In this case, the support band/cover band is transparent in the relevant spectral range.

It is advantageous if the at least one encoding layer is in the form of a band. This allows the scale body to be produced simply by joining a first band, namely the at least one encoding layer, to a second band, namely the support band/cover band.

It is quite particularly advantageous if the encoded scale body is formed in its entirety as a band. This allows a user to easily adapt the scale body to a special application. In particular, it is easy to make shape and length adjustments. For example, the scale body is then provided as a roll and a user can carry out the appropriate cutting to length.

Furthermore, in accordance with the invention, a position/displacement measuring system is provided, which comprises at least one scale body according to the invention and a sensor device comprising at least one sensor which is sensitive to the encoding.

In particular, the sensor device is positioned facing the cover band, so that the cover band covers the encoding material towards the outside space.

In one embodiment, the at least one sensor is sensitive to magnetic fields and the scale body is magnetically encoded by a particular sequence of magnetic north and south poles.

The following description serves in conjunction with the drawings to explain the invention in greater detail.

DETAILED DESCRIPTION

Figure 1:
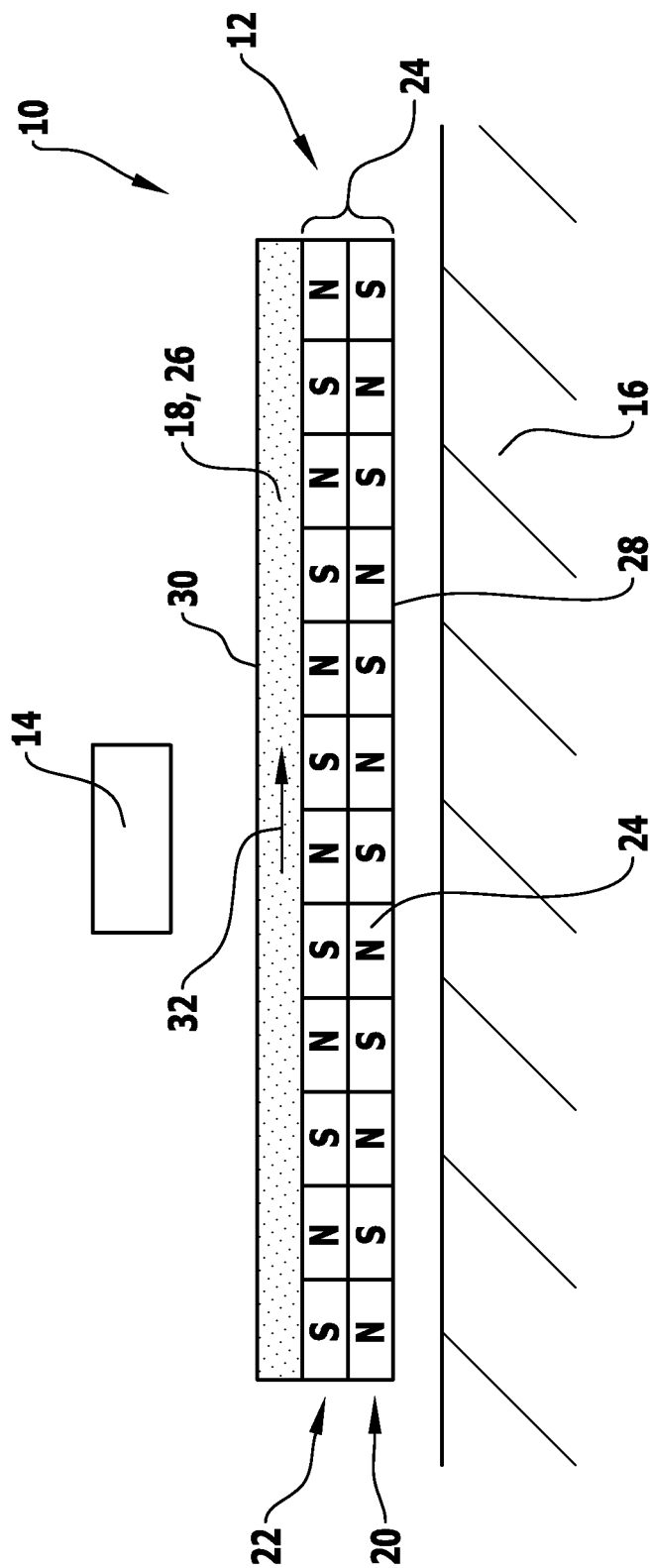
FIG. 1 shows a schematic representation of an embodiment of a position/displacement measuring system according to the invention.

An embodiment of a position/displacement measuring system according to the invention, which is shown schematically in FIG. 1 and indicated there by 10, comprises a magnetically encoded scale body 12 and a sensor device 14. The scale body 12 can be affixed to an application 16. The sensor device 14 comprises at least one magnetic-field-sensitive sensor and, in particular, a plurality of magnetic-field-sensitive sensors.

Position/displacement measuring systems with a magnetically encoded scale body are described, for example, in the chapter "Wegsensoren mit magnetisch kodiertem Maßkörper" (Displacement Sensors with Magnetically Encoded Scale Body) in the publication "Lineare Weg-und Abstandssensoren" (Linear Displacement and Distance Sensors) by Thomas Burkhardt, Albert Feinäugle, Sorin Fericean and Alexander Forkl, Verlag Moderne Industrie, Munich 2004. Explicit reference is made to this publication.

The scale body 12 comprises a support band 18 which is made of a non-magnetizable material. The support band 18 is made, in particular, of a metallic material and, for example, of stainless steel.

Arranged on the support band 18 is a device 20 made of magnetic (magnetizable) material as encoding material. This device 20 comprises at least one encoding layer 22 with magnetic pole fields 24. In the embodiment shown, the device 20 made of magnetic material comprises a first encoding layer and a second encoding layer.

In one encoding layer 22 magnetic pole fields (north pole fields and south pole fields) alternate with each other, the size and/or sequence of the pole fields determining the encoding. The encoding determines the field exposure of the sensor device 14 and is location-dependent. The position of the sensor device 14 relative to the scale body 12 can thereby be determined (without contact) by processing the corresponding signal.

The magnetic lines of field of the at least one encoding layer 22 form a three-dimensional vector field. The sensor device 14 is positioned in this vector field. For example, the sensor device 14 moves in the vector field. By counting magnetic periods which are detected by the sensor device 14, information on the distance traveled is obtained, and a directionality can be detected by a corresponding alignment of the sensor device 14. Absolute positions can, for example, be determined by carrying out a reference run.

It is also possible to implement the position/displacement measuring system 10 as an absolute measuring system without the need for a prior reference run. For this purpose, the at least one encoding layer 22 comprises in addition to at least one incremental track an absolute track which can be sensed by corresponding and magnetic-field-sensitive sensors of the sensor device 14. Reference is made here to the above-mentioned publication.

The device 20 is affixed to the support band 18 and, in particular, adhesively connected to it. The support band 18 is the (mechanical) holder for the device 20 made of magnetic material.

In one embodiment, the device 20 with the at least one encoding layer 22 is itself a band (indicated in FIG. 1 by reference numeral 24) which is affixed to the support band 18.

The magnetically encoded scale body 12 consists of the support band 18 and the device 20. The support band 18 forms a cover band 26 which covers the device 20 made of magnetic material and, in particular, protects it from mechanical damage.

The support band/cover band 18, 26 covers the device 20 made of magnetic material, in particular, towards an outside space. The cover band 26 is, in particular, arranged between the device 20 and the sensor device 14.

When positioning the scale body 12 on an application it is provided that the device 20 made of magnetic material faces the application 16 and, for example, rests against it. If the application 16 is made of a magnetizable material, then the magnetic forces of the device 20 can cause the scale body 12 to adhere to this application 16.

The magnetically encoded scale body 12 consists, with respect to the sequence of its layers, of layers of the support band 18/cover band 26 and the affixed (in particular, adhesively) device 20 made of magnetic material, and, as indicated above, the device 20 can comprise one or more encoding layers 22. The scale body 12 has a first surface 28 which is formed on the magnetic material of the device 20, and an opposing second surface 30 which is formed on the support band 18/cover band 26. The first surface 28 and the second surface 30 are preferably arranged at least approximately parallel to each other. The second surface 30 faces the sensor device 14 and the first surface 28 faces the application 16 and contacts the latter, for example, at least partially.

The scale body 12 with the support band 18 and the device 20 is, in particular, itself band-shaped and dimensionally stable. It is flexible and, in particular, elastically flexible as a whole in relation to a longitudinal direction of extent 32. This makes it possible to impart a bend to the scale body 12 and attach it, for example, to an uneven surface of an application 16. For example, it is possible to attach the scale body 12 to a cylindrical application.

The scale body 12 as a whole including support band 18/cover band 26 and device 20 is flexible so that the device 20 with the at least one encoding layer 22 can also be adapted in its form.

Figure 2:
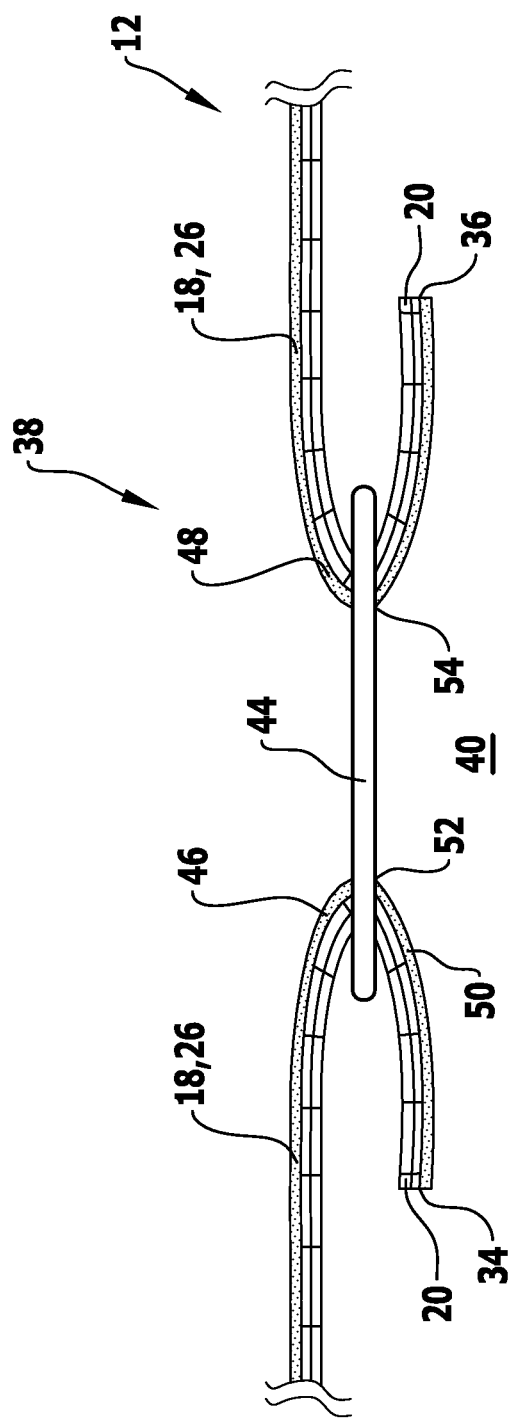
FIG. 2 shows a further representation of a section of a magnetically encoded scale body of a position/displacement measuring system according to the invention.

The band-shaped scale body 12 has a first end 34 and a second end 36 (FIG. 2). It is thereby, in principle, possible for the device 20 made of magnetic material to extend to the first end 34 and/or the second end 36, i.e., to the corresponding end of the support band 18, or for a corresponding first end and second end of the device 20 made of magnetic material to lie in front of the corresponding end of the support band 18. The ends of the scale body 12 are thereby formed by the ends of the support band 18.

Figure 4:
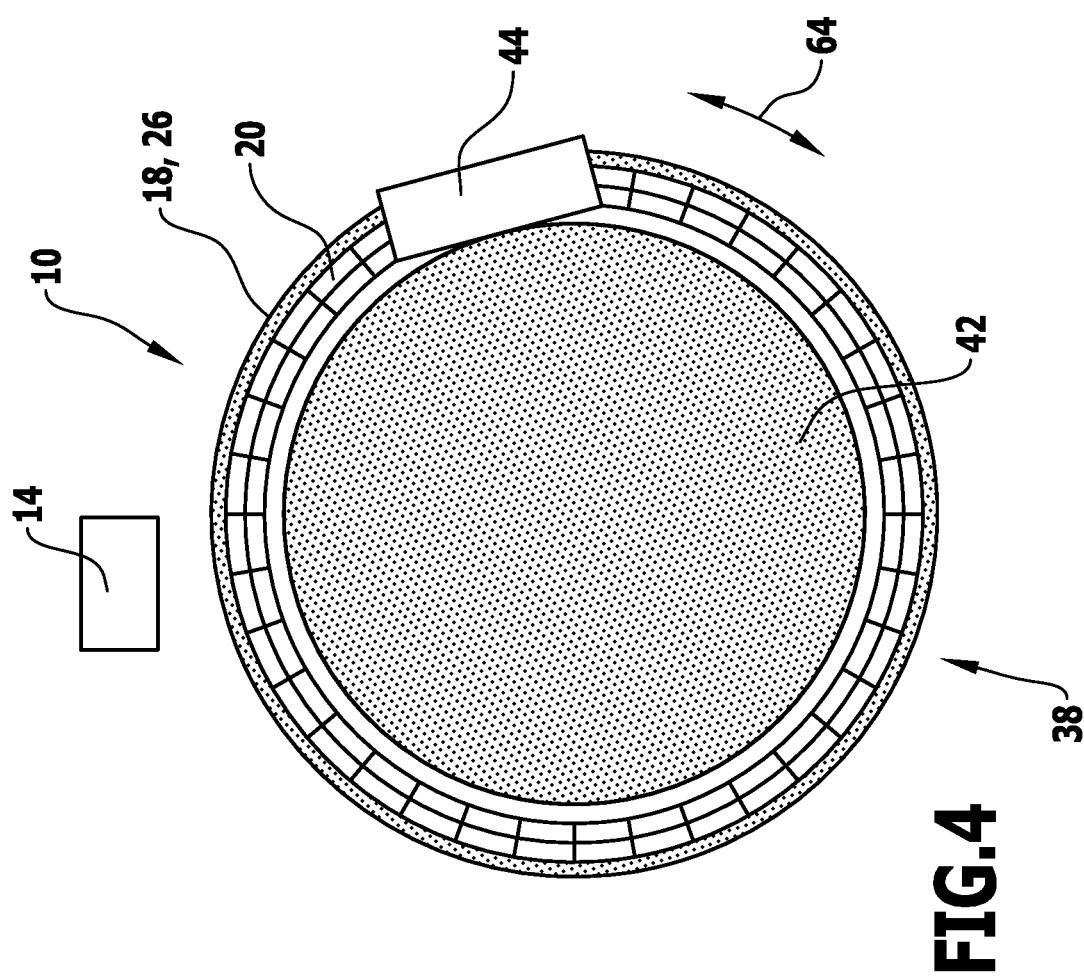
FIG. 4 shows an embodiment of a position/displacement measuring system according to the invention, which is arranged on an application.

In one embodiment, a closed device 38 is formed by the scale body 12 which encloses an interior space 40 and thereby can be placed around an application 42 (FIG. 4). The closed device 38 is of one-piece coherent configuration in a geometrical sense.

The closed device 38 can be produced by a connecting device 44 (FIGS. 2, 3) by means of which a first area 46 can be connected to or near the first end 34 and a second area 48 to or near the second end 36.

The scale body 12 comprises by virtue of the support band 18 (with or without device 20 made of magnetic material in the corresponding area) at the first area 46 and the second area 48, respectively, a bend or curve 50. This bend or curve 50 is formed by plastic deformation of the support band 18 (which may follow the device 20).

The connecting device 44 comprises as first fixing device a first opening 52 through which the scale body 12 is passed at the first area 46 with the corresponding bend or curve 50. Furthermore, the connecting device 44 comprises as second fixing device a second opening 54 through which the scale body 12 is passed in the second area 48 with the corresponding bend or curve 50. The scale body 12 is held in hook fashion on the connecting device 44 by means of the bend or curve 50.

The distance between the first opening 52 and the second opening 54 is adjustable. For example, by shortening the distance between the first opening 52 and the second opening 54 a better abutment of the scale body 12 on the application 42 can be achieved, i.e., the application 42 can be positioned in the interior space 40, and by reducing the distance between the first opening 52 and the second opening 54 it is affixed to the application 42.

Figure 3:
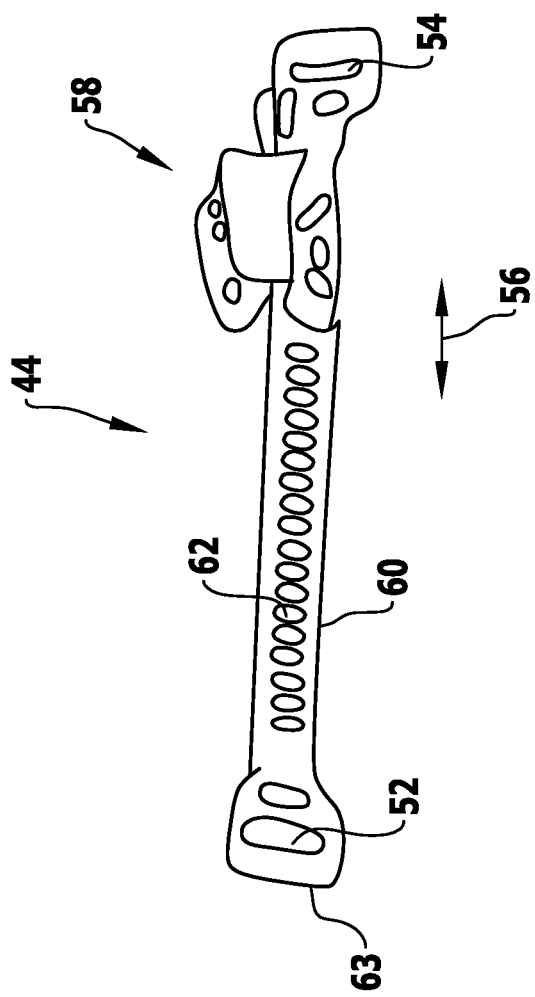
FIG. 3 shows an embodiment of a connecting device.

In FIG. 3, the relative adjustability of the distance between the first opening 52 and the second opening 54 is indicated by the double arrow with reference numeral 56.

A locking device 58 can be provided to adjust and fix a position. The connecting device 44 comprises, for example, a web element 60 with discretely spaced openings 62. At the web element 60 near a first end 63 the first opening 52 is formed.

The connecting device 44 furthermore comprises the locking device 58 on which the web element 60 is mounted in a fixedly displaceable manner. The second opening 54 is located on the locking device 58. By adjusting the displacement position relative to the web element 60 of the locking device 58 the distance between the first opening 52 and the second opening 54 can be set and fixed using the locking device 58. For this purpose, for example, there is located on the locking device 58 a screw which can extend into a corresponding opening 62. The special opening 62 determines the distance.

A tension force may also be exerted using the locking device 58 so that the closed device 38 can be held tightly against the application 42.

The connecting device 44 is formed, for example, in the manner of a clamp.

An application example is shown in FIG. 4. The corresponding position/displacement measuring system 10 is positioned on a cylindrical application 42. The scale body 12 is placed circumferentially around the application 42, and the closed device 38 is produced using the corresponding connecting device 44. The sensor device 14 is spaced from the scale body 12. The latter is covered and thereby protected towards the outside space by the cover band 26.

This makes it possible, for example, to detect angular positions of the application 42 relative to the sensor device 14. For example, the application 42 with the affixed scale body 12 can be rotated (in particular, the application 42 is a shaft) or pivoted relative to the fixed sensor device 14. This is indicated in FIG. 4 by the double arrow 64.

It is, for example, also possible that the application 42 is stationary with the scale body 12 immovably mounted on it and that the sensor device 14 is positionable in various angular positions relative to the application 42. For example, the sensor device 14 is movable on an orbital path. The corresponding position can be detected on this path.

It is, in principle, also possible that both the position of the application 42 with the scale body 12 and the position of the sensor device 14 can be altered.

In the solution according to the invention, the cover band 26 is identical with the support band 18. The cover band 26 has both the mechanical support function for the device 20 made of magnetic material and a protective function with respect to external effects for the device 20. In the application case according to FIG. 4, the cover band 26 protects, for example, against radial effects such as mechanical forces.

The scale body 12 can be simply formed in an elastic manner so that it can also be affixed to curved surfaces. By means of the integral formation of support band 18 and cover band 26 a bending of the scale body 12 as a whole is simple to perform without the risk of separating the device 20 from the support band 18. In a construction consisting of the sequence support band, device made of magnetic material, cover band there is an inherent risk of separation, since the support band and the cover band impinge on the device differently from two sides when there is a bend. The solution according to the invention eliminates this risk.

By providing the connecting device 44 it is simple to place the scale body 12 circumferentially around an application. The application can then have basically any shape.

The scale body 12 can be affixed to a surface of a magnetizable application by means of the corresponding magnetic forces, and the exact position can be easily adjusted. This results in simplified installation when the application is magnetizable.

The scale body 12 is dimensionally stable in its longitudinal direction of extent 32 with integrated protection provided by the cover band 26.

In principle, the scale body 12 can be supplied as band material so that a user can also easily shorten the scale body 12 to suit the application and affix it using the connecting device 44.

In accordance with the invention, a flexible and at the same time economical solution is provided.

With use of the position/displacement measuring system 10 according to the invention, measuring accuracies on the order of ±20 µm or better can be achieved when the magnetic encoding is correspondingly implemented in the at least one encoding layer 22.

In the solution according to the invention, the application 16, 42 is also used as contact surface.

The idea according to the invention can also be applied to encoded scale bodies which are not magnetically encoded. For example, corresponding capacitively encoded scale bodies can be provided. In this case, the support band/cover band is made of an electrically non-conductive material. The at least one sensor of a corresponding position/displacement measuring system is then sensitive to electrostatic fields.

In another embodiment, the scale body is optically encoded. The support band/cover band is then optically transparent in the relevant spectral range. The corresponding sensor device of the thereby formed position/displacement measuring system comprises at least one optical sensor which can detect the encoding.

What is claimed is:

1. Encoded scale body for a position/displacement measuring system, consisting of:
   a support band; and
   at least one encoding layer made of encoding material, wherein:
   the encoding material is arranged on the support band;
   the support band covers the encoding material towards an outside space such that the support band forms a cover band that protects the encoding material; and
   the support band is elastically flexible.

2. Encoded scale body in accordance with claim 1, wherein the support band covers the encoding material towards a sensor device.

3. Encoded scale body in accordance with claim 1, wherein the support band is made of stainless steel.

4. Encoded scale body in accordance with claim 1, wherein when the scale body is mounted on a component, the at least one encoding layer made of encoding material lies between the component and the support band.

5. Encoded scale body in accordance with claim 4, wherein the at least one encoding layer contacts the component at least partially.

6. Encoded scale body in accordance with claim 1, wherein the encoding material is fixed directly to the support band.

7. Encoded scale body in accordance with claim 1, wherein the support band is dimensionally stable.

8. Encoded scale body in accordance with claim 1, wherein the scale body consists, with respect to the sequence of layers, of the support band, and the at least one encoding layer on the support band.

9. Encoded scale body in accordance with claim 1, comprising a first surface formed on the encoding material, and an opposing second surface formed on the support band.

10. Encoded scale body in accordance with claim 1, wherein the scale body has a bend.

11. Encoded scale body in accordance with claim 1, wherein the support band has a curve or bend at at least one end.

12. Encoded scale body in accordance with claim 1, wherein the scale body is magnetically encoded, and the encoding material is a magnetic material.

13. Encoded scale body in accordance with claim 12, wherein the scale body is affixed to a magnetizable component by magnetic adherence.

14. Encoded scale body in accordance with claim 1, wherein the at least one encoding layer is in the form of a band.

15. Encoded scale body in accordance with claim 1, formed in its entirety as a band.

16. Position/displacement measuring system, comprising:
   at least one scale body, said at least one scale body consisting of:
   a support band; and
   at least one encoding layer made of encoding material, wherein:
   the encoding material is arranged on the support band;
   the support band covers the encoding material towards an outside space such that the support band forms a cover band that protects the encoding material; and the support band is elastically flexible; and
a sensor device comprising at least one sensor which is sensitive to the encoding.

17. Position/displacement measuring system in accordance with claim 16, wherein the sensor device is positioned facing the support band.

18. Position/displacement measuring system in accordance with claim 16, wherein the at least one sensor is sensitive to magnetic fields, and the scale body is magnetically encoded.

19. Position/displacement measuring system in accordance with claim 16, comprising a connecting device, which connects a first area of the scale body and a second area of the scale body to each other, the first area lying in the vicinity of a first end of the scale body, and the second area lying in the vicinity of a second end of the scale body.

20. Position/displacement measuring system in accordance with claim 19, wherein the connecting device comprises a first fixing device for the first area of the scale body and a second fixing device for the second area of the scale body, a distance between the first fixing device and the second fixing device being fixedly adjustable.

21. Position/displacement measuring system in accordance with claim 19, wherein the combination of scale body and connecting device forms a closed device.

* * * * *